United States Patent
Kerametlian et al.

(10) Patent No.: US 10,320,848 B2
(45) Date of Patent: Jun. 11, 2019

(54) SMART LOCKOUT

(71) Applicant: Microsoft Technology Licensing, LLC., Redmond, WA (US)

(72) Inventors: Alexandre Kerametlian, Redmond, WA (US); Amit Dhariwal, Redmond, WA (US); Dana Kaufman, Redmond, WA (US); Winfred Wong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/223,040

(22) Filed: Jul. 29, 2016

(65) Prior Publication Data
US 2017/0208075 A1    Jul. 20, 2017

Related U.S. Application Data

(60) Provisional application No. 62/279,641, filed on Jan. 15, 2016.

(51) Int. Cl.
*H04L 29/06* (2006.01)
*G06F 21/31* (2013.01)

(52) U.S. Cl.
CPC ............ *H04L 63/205* (2013.01); *G06F 21/31* (2013.01); *H04L 63/083* (2013.01); *G06F 2221/2111* (2013.01)

(58) Field of Classification Search
CPC ..... H04L 63/205; H04L 63/083; G06F 21/31; G06F 2221/2111
See application file for complete search history.

(56) References Cited

U.S. PATENT DOCUMENTS

| | | | |
|---|---|---|---|
| 5,559,505 | A | 9/1996 | McNair |
| 5,699,514 | A | 12/1997 | Durinovic-Johri et al. |
| 7,032,026 | B1 | 4/2006 | Biswas et al. |
| 8,234,499 | B2 | 7/2012 | Abraham et al. |
| 8,272,040 | B2 | 9/2012 | Chaudhry et al. |
| 8,312,540 | B1 | 11/2012 | Kahn et al. |
| 8,490,162 | B1 | 7/2013 | Popoveniuc et al. |
| 9,258,715 | B2 | 2/2016 | Borghei |
| 9,275,219 | B2 | 3/2016 | Cross et al. |
| 9,699,173 | B1* | 7/2017 | Roth .................. H04L 63/0846 |
| 2004/0059951 | A1* | 3/2004 | Pinkas .................. G06F 21/34 726/5 |

(Continued)

OTHER PUBLICATIONS

Brostoff, Sacha, et al., "'Ten strikes and you're out': Increasing the number of login attempts can improve password usability," in Proceedings of CHI Workshop on Human-Computer Interaction and Security Systems, Apr. 5, 2003, (4 pages).

(Continued)

*Primary Examiner* — Robert B Leung
*Assistant Examiner* — Thomas Ho
(74) *Attorney, Agent, or Firm* — Workman Nydegger

(57) ABSTRACT

Embodiments are directed to having multiple lockout counters that apply to login requests from different origins. More specifically, one counter is associated with a user's familiar locations, another counter is associated with unfamiliar locations. In another embodiment, hashes of incorrect passwords are recorded so that lockout counters are not incremented multiple times when the same incorrect password is entered repeatedly.

20 Claims, 5 Drawing Sheets

(56) References Cited

U.S. PATENT DOCUMENTS

| | | | |
|---|---|---|---|
| 2009/0254975 A1* | 10/2009 | Turnbull | H04L 63/0492 726/3 |
| 2010/0192205 A1* | 7/2010 | Chaudhry | G06F 21/31 726/5 |
| 2011/0252464 A1* | 10/2011 | Sanjeev | H04L 63/107 726/7 |
| 2013/0219454 A1 | 8/2013 | Hewinson | |
| 2013/0291097 A1* | 10/2013 | Tsukamoto | G06F 21/31 726/19 |
| 2013/0305324 A1 | 11/2013 | Alford et al. | |
| 2014/0007208 A1 | 1/2014 | Faludi | |
| 2016/0055327 A1* | 2/2016 | Moran | G06F 21/32 726/19 |
| 2016/0125522 A1* | 5/2016 | Tang | G06Q 40/00 705/35 |

OTHER PUBLICATIONS

Abizer, "How an incorrectly configured account lockout policy can give more pain than security," published on: Apr. 21, 2013, available at: https://blogs.technet.microsoft.com/abizerh/2013/04/21/how-an-incorrectly-configured-account-lockout-policy-can-give-more-pain-than-security/, (5 pages).

* cited by examiner

SMART LOCKOUT

CROSS-REFERENCE TO RELATED APPLICATIONS

This application claims the benefit of the filing date of U.S. Provisional Patent Application No. 62/279,641, which is titled "Smart Lockout" and was filed Jan. 15, 2016, the disclosure of which is hereby incorporated by reference herein in its entirety.

BACKGROUND

As a security measure, users' passwords need to be protected against brute-force attacks from malicious actors who are trying to guess the passwords. The traditional password lockout implementation uses a counter to track the consecutive incorrect passwords that are entered for a given account. Once the counter is above a certain threshold, the algorithm assumes that a bad actor is attempting to guess the password via brute force. The account is then locked for protection against unauthorized access. However, the traditional counter-based method (i.e., the account is locked after some number of consecutive incorrect password attempts) has shortcomings that lead to a high false-positive rate in brute-force detection, resulting in user friction. There are several major shortcomings with this traditional approach.

Because the account is online, a malicious actor can conduct a brute-force attack on a user's account from any Internet-connected device from anywhere in the world. After the specified number of incorrect password attempts, the account would be locked out either temporarily or permanently and secured until a support team intervenes to provide access. Once the specified number of incorrect password attempts occurs, the account would be just as inaccessible to the account owner as to the malicious actor. The malicious actor may do this expressly for the purpose of keeping users out of their accounts, or it may happen in the process of attempting to gain access to the account.

Due to the way modern cloud-connected devices work, users can accidentally lock themselves out of their own account. Many users have devices that periodically log into their account on their behalf with a stored password to fetch their mail or get updates. If a user changes their password but forgets to update the password stored on the device (or simply configures the device with an incorrect password in the first place), the device will then repeatedly try to log in on the user's behalf unsuccessfully, resulting in the user's account being locked. In some systems, the counter for tracking failed login attempts is not incremented when a previous password or last-tried password is used.

Typically, successful logins reset incorrect password counters to zero, so a client device that periodically synchronizes with an account having a stored password creates an opportunity for malicious actors to have increased numbers of attempts to guess a password.

Some sites allow a locked-out user to send a code to a device known by the system via email, text, or otherwise, then enter that code at login to reset the password. This allows a user to recover from the locked-out state but adds additional friction to the login process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A smart password system is disclosed. Embodiments of the smart password system mitigate issues found in prior password systems and provide a better user experience without compromising security. The password system is designed to reduce user friction incurred from false positives. Two main improvements are added to the basic password algorithm.

In a first improvement, instead of having one failed-attempt counter, the improved password system uses multiple counters. In the simplest embodiment, two counters are used. One counter is used for login requests that come from a user's familiar locations, such as geographic locations from which the system has observed successful user logins in the past. A separate counter is for login requests that come from unfamiliar locations.

In a second improvement, a list is maintained for the complete or partial hashes of recent incorrect passwords entered by a user (e.g., the last n incorrect passwords). If the user continues to enter one of those recent incorrect passwords, the system does not increment the counter when the request uses a repeated bad password. This prevents password lockouts by an application that has cached the wrong password (e.g., if the password was changed by the user but not updated in the application) or by users who repeatedly mistype their own password while attempting to log in.

Embodiments are directed to having multiple lockout counters that apply to login requests from different origins. More specifically, one counter is associated with a user's familiar locations, another counter is associated with unfamiliar locations.

In another embodiment, hashes of incorrect passwords are recorded so that lockout counters are not incremented multiple times when the same incorrect password is entered repeatedly.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
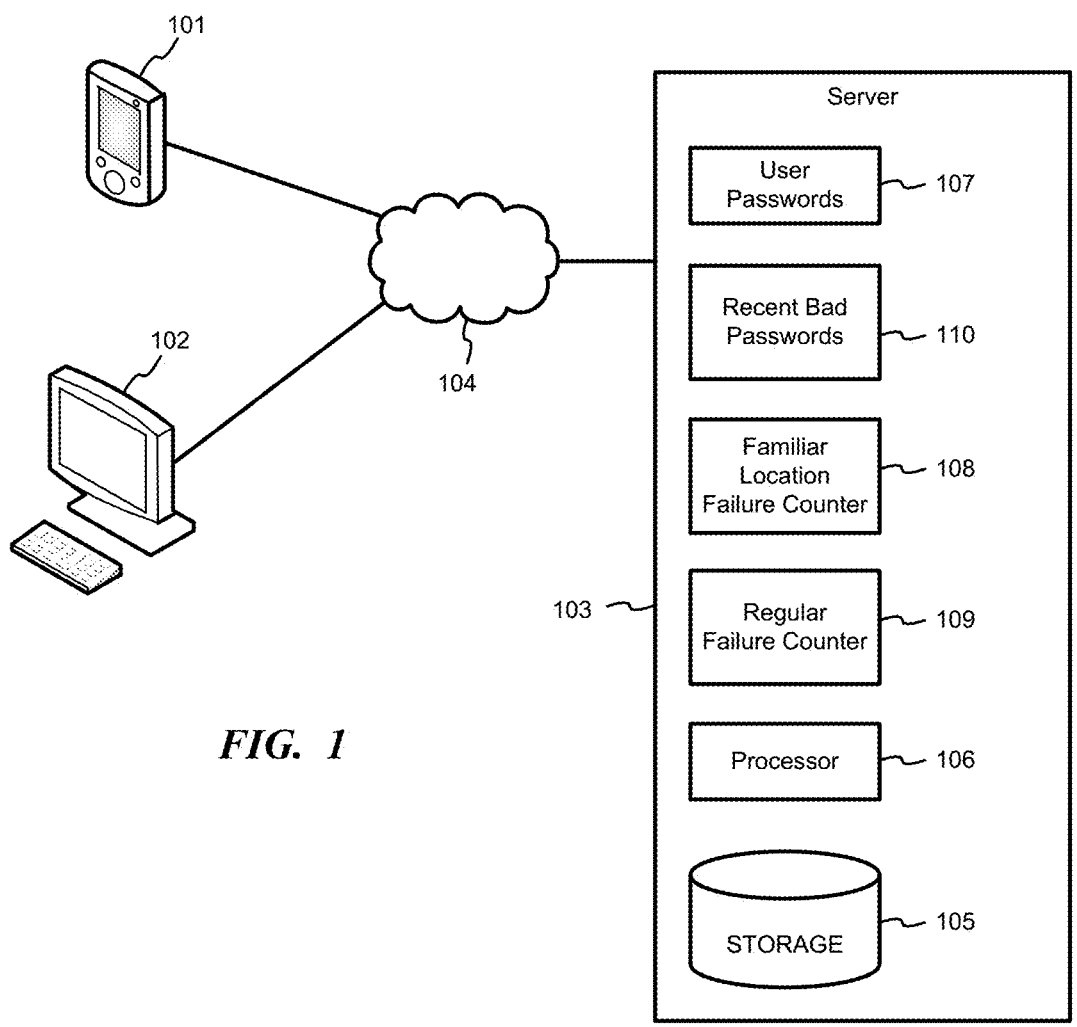
FIG. 1 is a block diagram of a system employing a smart password system according to an example embodiment.

FIG. 1 is a block diagram of a system employing a smart password system according to an example embodiment.

Users at devices 101, 102 access applications on server 103 via network 104. The applications may be provided by software instructions stored in memory 105 and executed on processor 106. For security purposes, the application may be password protected. The users provide a password in an authentication request to access server 103 or an application. Server 103 provides a smart password system to control user access. The smart password system may be, for example, an application executing on processor 105. The smart password system maintains a list of user passwords 107. Typically, if the user provides a correct password that matches the stored user password 107, then the system authenticates the user and allows access to server 103 and applications executing thereon. If the user provides a bad password, then the system will prompt the user to reattempt another login.

A first advantage of the smart password system comes from how it determines whether or not an account is in the locked-out state. Standard password algorithms use a single failure counter that tracks the number of consecutive incorrect passwords entered. If the counter is above a certain threshold (e.g., ten consecutive failures) and the single counter was last updated within the time window of a lockout duration, then the account is currently locked out. The lockout duration may be initially set to a first duration (e.g., 60 seconds) and increases exponentially after subsequent lockouts.

The improved smart password algorithm uses at least two different counters. An example implementation may use one counter for familiar locations and one counter for unfamiliar locations. However, additional counters may be used to represent each familiar and/or unfamiliar location. For example, Seattle and San Francisco maybe the familiar locations for a particular user, so one counter is associated with logins from Seattle and one counter is associated with logins from San Francisco. Similarly, multiple counters may be used to track login attempts from different unfamiliar locations. In the simplified example illustrated in FIG. 1, a first counter 108 counts authentication requests coming from one of the user's or the account's "familiar locations." A second counter 109 counts all other authentications. The users' or the account's familiar locations are the geographic locations from where the smart password system has previously observed the user successfully log in.

When evaluating a particular authentication request, the smart password system first determines whether the request came from a location that is familiar to the user's account. A system and method for determining a familiar login locations is disclosed in U.S. Pat. No. 9,177,125, entitled "Protection from Unfamiliar Login Locations, issued on Nov. 3, 2015, the disclosure of which is incorporated herein in its entirety. If so, the algorithm uses the user account's familiar location failure counter 108. If the request did not come from a familiar location, then the algorithm uses the regular failure counter 109. This approach prevents bad authentication requests coming from around the world from interfering with the account's normal usage. For example, a malicious actor from Canada attempting to brute-force the password of an account that has previously only logged in from the United States would get locked out, while the account may continue to be signed as usual from the United States. By using multiple login counters, a malicious actor has limited chances to get through since the regular counter is not reset after a successful login. Therefore, attempts to login with bad passwords from unfamiliar locations after a successful login will be counted on top of prior bad password attempts.

The location of an originating authentication request or password may be detected to varying levels of specificity. For example, a user's location may be represented by a particular physical location, such as a country, state, city, or other region. Such locations may be determined by performing a geographic look-up on the IP address of the authentication request sender.

A second advantage comes from a mechanism that detects when an account fails to authenticate repeatedly with the same incorrect password. To achieve this, a list of recent bad passwords hashes 110 is maintained for each account. The list of previously seen bad password hashes for each user may be stored in a cache or other storage. These bad password hashes are potentially sensitive data, so the same security precautions are applied to this list as with valid credentials. That is, only the iterative hash is stored (e.g., computed at password check time) and the property will be encrypted when stored in the cache. The maximum number of bad passwords to remember is configurable.

To simplify the smart password system, no special logic need be applied to the prior bad password list to avoid storing extra data and minimize writes. The list will simply hold the last three (or other number) bad passwords seen. For example, if the list contains bad passwords <p1, p2>. When the user tries to log in with p1 or p2, the list will remain unchanged. When the user tries to log in with bad password p3, the smart password system write back <p3, p1>, and p2 is forgotten. Additionally, the bad password cache items may be set to expire periodically, such as after 24 hours.

When evaluating an authentication request, if the password used is incorrect the password system first checks its hash against the account's list. If the incorrect password's hash is not in the list 110, then it is added to the list 110 and the algorithm proceeds to increment the appropriate failure counter (familiar location 108 or regular 109) as normal. If, however, the list contains the incorrect password's hash, then the password system will not increment any failure counter. Thus, if the account repeatedly attempts to authenticate using the same incorrect password multiple times, only the first failed attempt will increment the counter and the account will not be locked out.

When a successful login occurs, either counter 108 or counter 109 is reset depending upon whether the login comes from that counters bucket. For example, if the login is successful from a familiar location, then only the familiar-location counter 108 is reset but not the other counter 109.

It will be understood that the term "password" as used herein refers to any string of alphabetic, numeric, special, and/or other characters of any length that is selected by, or assigned to, a user. The password includes all types of credentials, application passwords, authenticator-generated codes, codes sent via email, text, message or mobile device, secret answer, one-time use code, one-time token (OTT), and the like. The password may be a personal identification number (PIN) in some embodiments.

Figure 2:
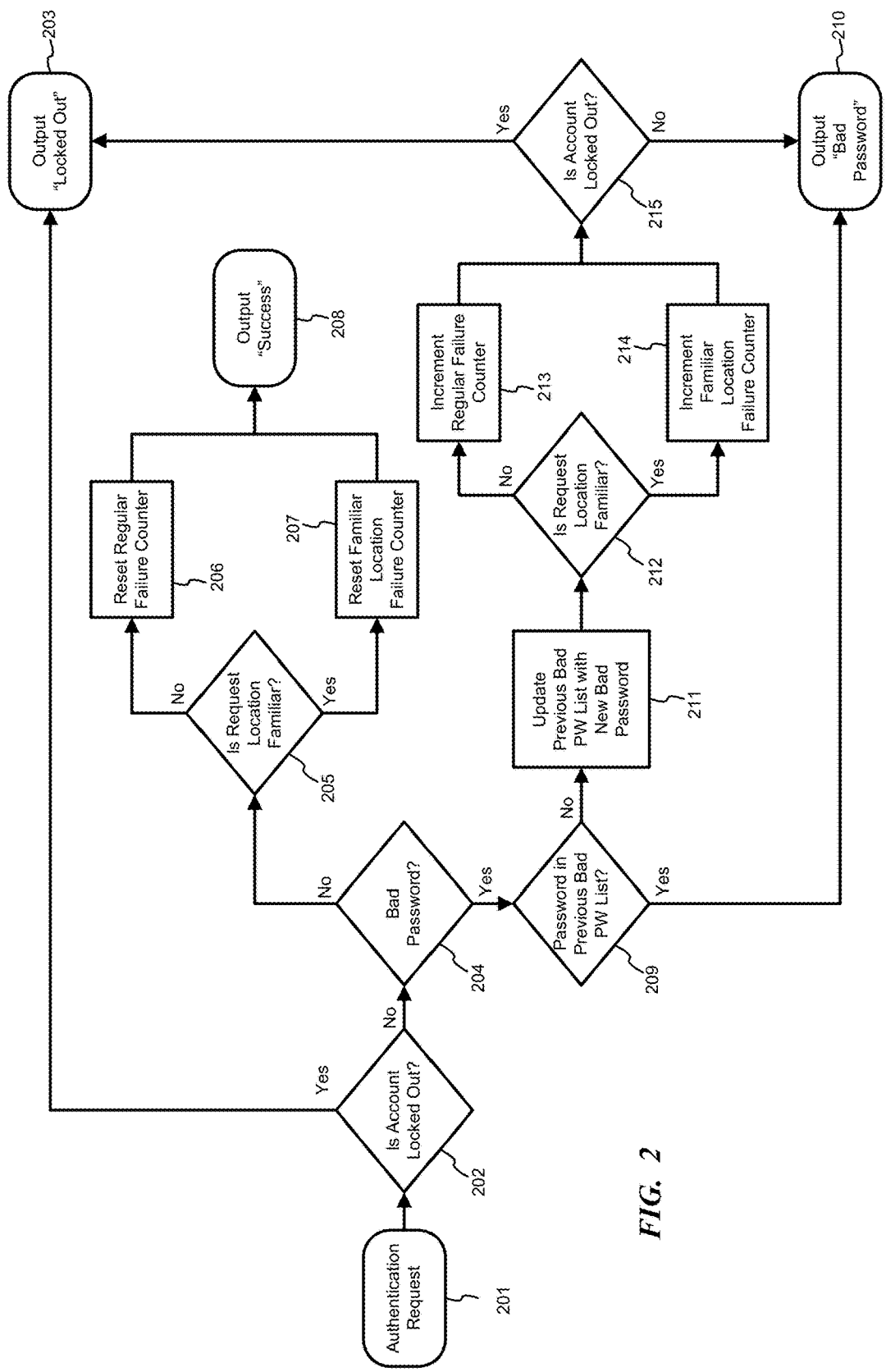
FIG. 2 is a flowchart outlining an example process for determining whether an account is or should be locked out in response to authentication requests.

FIG. 2 is a flowchart outlining an example process for determining whether an account is or should be locked out in response to authentication requests. An authentication request for an account is received in step 201. The authentication request includes a password that is purportedly associated with an account that a user is attempting to access. At step 202, the process determines whether the account is currently locked out. If the account is currently locked out, then at step 203 the process returns a "locked out" output in response to the authentication request. If the account is not currently locked out at step 202, then the process moves to step 204 and determines if the password is valid.

If a bad password was not provided (i.e., the correct password is received in the authentication request), then the process moves to step 205 to analyze the originating location for the authentication request. If the location is not familiar, then the process moves to step 206, and the regular failure counter is reset. Alternatively, if the location is familiar, then the algorithm moves to step 207, and the familiar location failure counter is reset. After either counter is reset in step 206 or 207, then the process returns a "success" output in response to the authentication request at step 208.

If it is determined in step 204 that a bad password was received, then the process moves to step 209 and determines if the bad password is in the list of previously received bad passwords. If the current bad password is already on the list of previously received bad passwords, then the process moves to step 210 and returns a "bad password" output in response to the authentication request. Alternatively, if the current bad password is not on the list of previously received bad passwords, then the process moves to step 211 and adds the current bad password to the list of previously received bad passwords.

After updating the list of previously received bad passwords in step 211, the process analyzes the origination location for the authentication request in step 212. If the request location is not familiar (i.e., there are no prior successful logins from this location), then in step 213 the process increments the regular failure counter. Alternatively, if the request location is familiar (i.e., prior successful logins have originated from this location), then in step 214 the process increments the familiar location failure counter. After updating the appropriate counter based on the originating location of the authentication request, the process moves to step 215 to determine whether the account is locked out.

If the account is now locked out, then the process moves to step 203 and returns a "locked out" output in response to the authentication request. Alternatively, if account is not yet locked out, then the process moves to step 210 and returns a "bad password" output in response to the authentication request.

Figure 3:
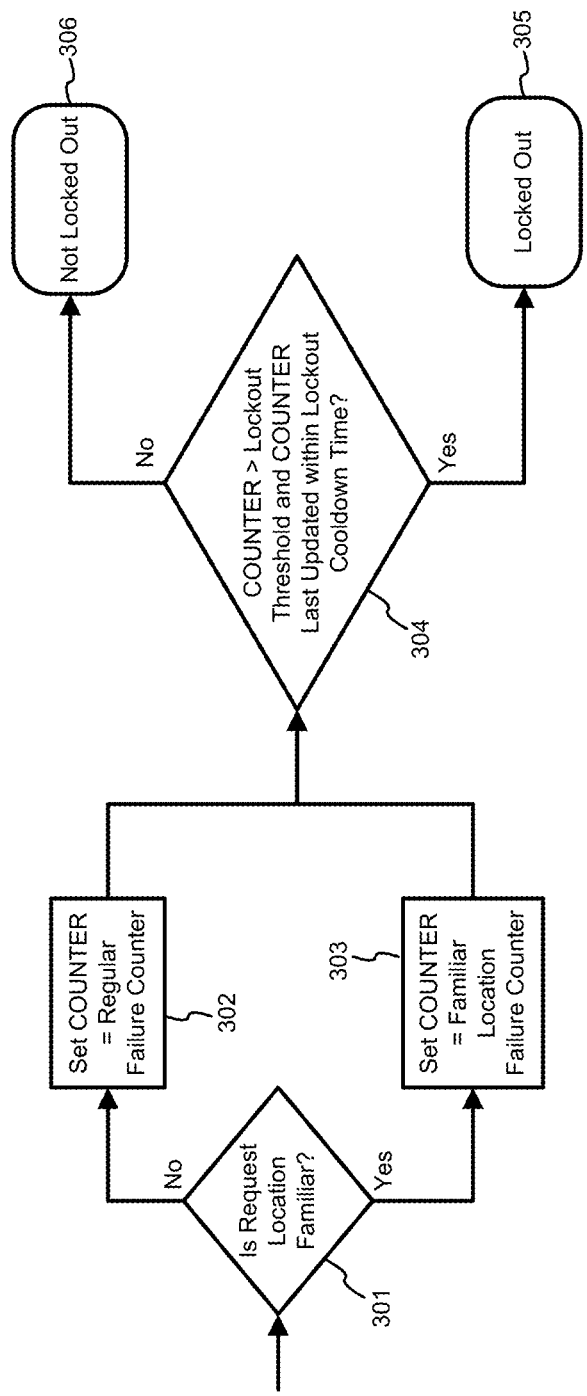
FIG. 3 is a flowchart outlining an example process for determining whether an account is locked out.

FIG. 3 is a flowchart outlining an example process for determining whether an account is locked out, such as determined in steps 202 and 215 of FIG. 2. The process begins in step 301 by determining whether the authentication request originates from a familiar location. If the location is not familiar, then the process moves to step 302 and the counter for evaluation is set to the regular failure counter. Alternatively, if the location is familiar, then the process moves to step 303 and the counter for evaluation is set to the familiar location failure counter.

After setting which counter is being evaluated, the process moves to step 304 and determines whether the selected counter is greater than a lockout threshold. Additionally, in step 304 the process determines whether the counter was last updated within a lockout cooldown time. If the counter is both above a lockout threshold and was last updated within the lockout cooldown time, then the process moves to step 305 and identifies the account as locked out. Alternatively, if the counter is either below the lockout threshold or was last updated outside the lockout cooldown time or both, then the process moves to step 306 and identifies the account as not locked out.

The process illustrated in FIG. 3 allows the lockout determination to be based on whether the regular failure counter or the familiar location failure counter have reached a predetermined threshold. Each counter may be assigned a different threshold so that, for example, login attempts from familiar locations are allowed a higher number of failed login attempts than the number of failed attempts allowed from other locations.

The lockout cooldown time allows the account to be reset so that users are not permanently locked out. Instead, after the lockout cooldown time, the user may again attempt to access the account.

The processes disclosed herein enhance password lockout so that it recognizes when a user keeps repeating the same bad password. In these cases, the lockout counter should not increment and the user should not get locked out. Additionally, the process limits this behavior for authentication requests that originate from a familiar location because the system has a higher confidence that such attempts are actually from the real user and not a malicious actor.

It will be understood that steps 201-215 of the process illustrated in FIG. 2 and steps 301-306 of the process illustrated in FIG. 3 may be performed in different orders and may be performed once or repetitiously.

Figure 4:
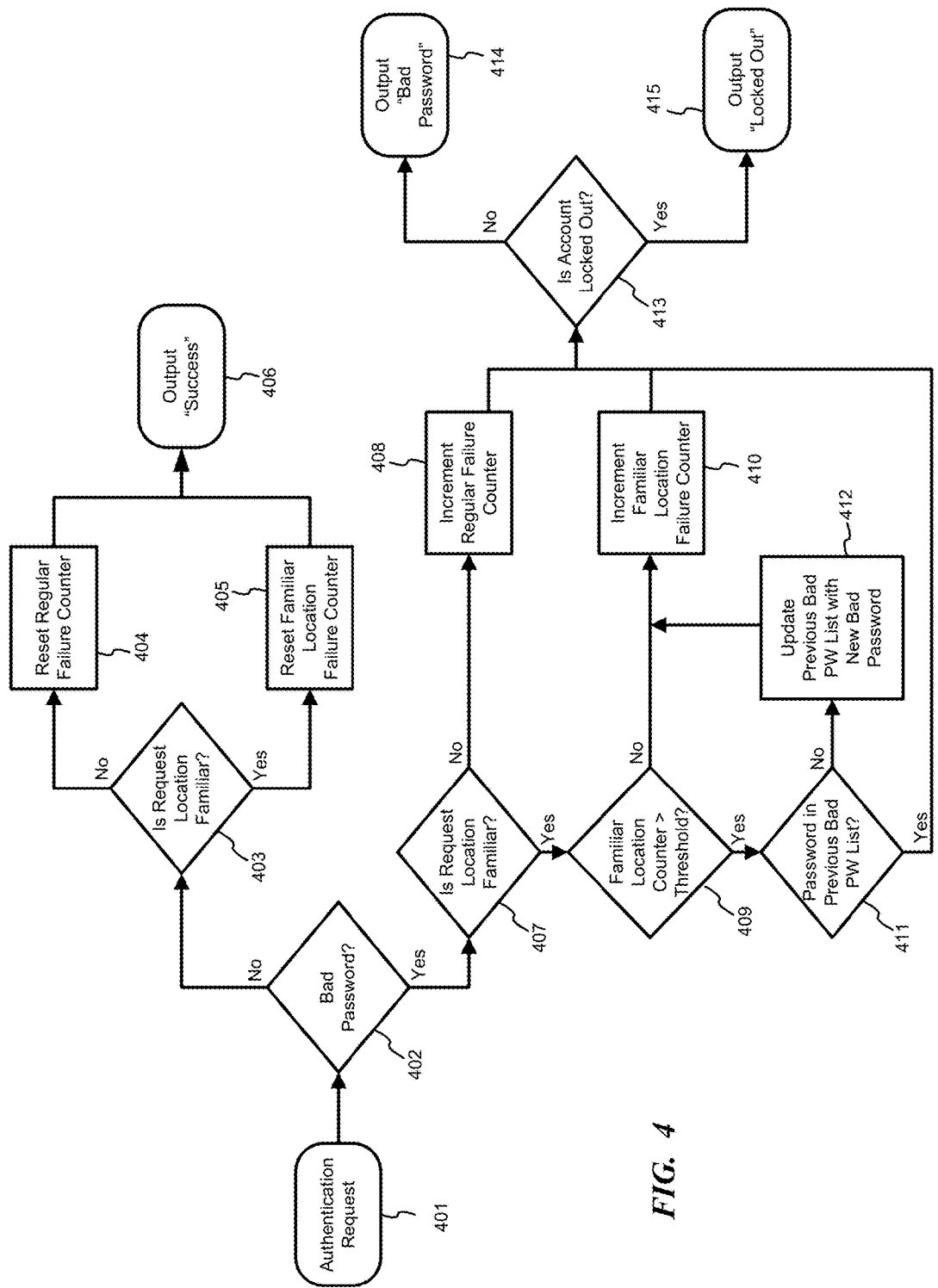
FIG. 4 is a flowchart outlining another example process for determining whether an account is or should be locked out in response to authentication requests in accordance with an alternative embodiment.

FIG. 4 is a flowchart outlining another example process for determining whether an account is or should be locked out in response to authentication requests in accordance with an alternative embodiment. An authentication request for an account is received in step 401. The authentication request includes a password that is purportedly associated with an account that a user is attempting to access. At step 402, the process determines if the password in the authentication request is valid. If the password is valid, then the process moves to step 403 to analyze the originating location for the authentication request. If the location is not familiar, then the process moves to step 404, and the regular failure counter is reset. Alternatively, if the location is familiar, then the algorithm moves to step 405, and the familiar location failure counter is reset. After either counter is reset in step 404 or 405, then the process returns a "success" output in response to the authentication request at step 406.

If it is determined in step 402 that a bad password was received, then the process moves to step 407 to analyze the originating location for the authentication request. If the location is not familiar, then the process moves to step 408, and the regular failure counter is incremented. Alternatively, if the location is familiar, then the algorithm moves to step 409 to determine if the familiar location failure counter is above a threshold.

If the familiar location failure counter has not exceeded the threshold, then in step 410 the process increments the familiar location failure counter. Alternatively, if the familiar location failure counter has exceeded the threshold, then the process moves to step 411 to determine if the bad password is in the list of previously received bad passwords.

If the current bad password is not already on the list of previously received bad passwords, then the process moves to step 412 and adds the current bad password to the list of previously received bad passwords. Then the process moves to step 410 and increments the familiar location failure counter. Additionally, a separate list of bad passwords used from unfamiliar locations may also be maintained, such as by updating a list of unfamiliar-location bad passwords between steps 407 and 408.

If the current bad password is on the list of previously received bad passwords at step 411, then the process moves to step 413 to determine whether the account is locked out. Alternatively, after updating the counters in steps 408 or 410, the process moves to step 413.

If the account is determined to be not locked out at step 413, such as by using the process illustrated in FIG. 3, then the process moves to step 414 and returns a "bad password" output in response to the authentication request. Alternatively, if the account is locked out, then the process moves to step 415 and returns a "locked out" output in response to the authentication request.

Although the examples used herein refer to a "familiar location" counter, it will be understood that other traits may be used to provide smart password analysis. At its base, the smart password system uses multiple counters to evaluate bad password attempts. One counter tracks attempts associated with a feature related to the purported user (e.g., a familiar location), and another counter tracks all other attempts (e.g., attempts from new locations). The familiar trait associated with the first counter may refer to a geographic location as well as to a device. For example, the user's trait may be associated with the device that initiates the authentication request. Devices may be determined using device identifiers in an authentication request message, such as an international mobile equipment identity (IMEI), international mobile subscriber identity (IMSI), email address, phone number, certificate, or other information associated with a particular device.

Figure 5:
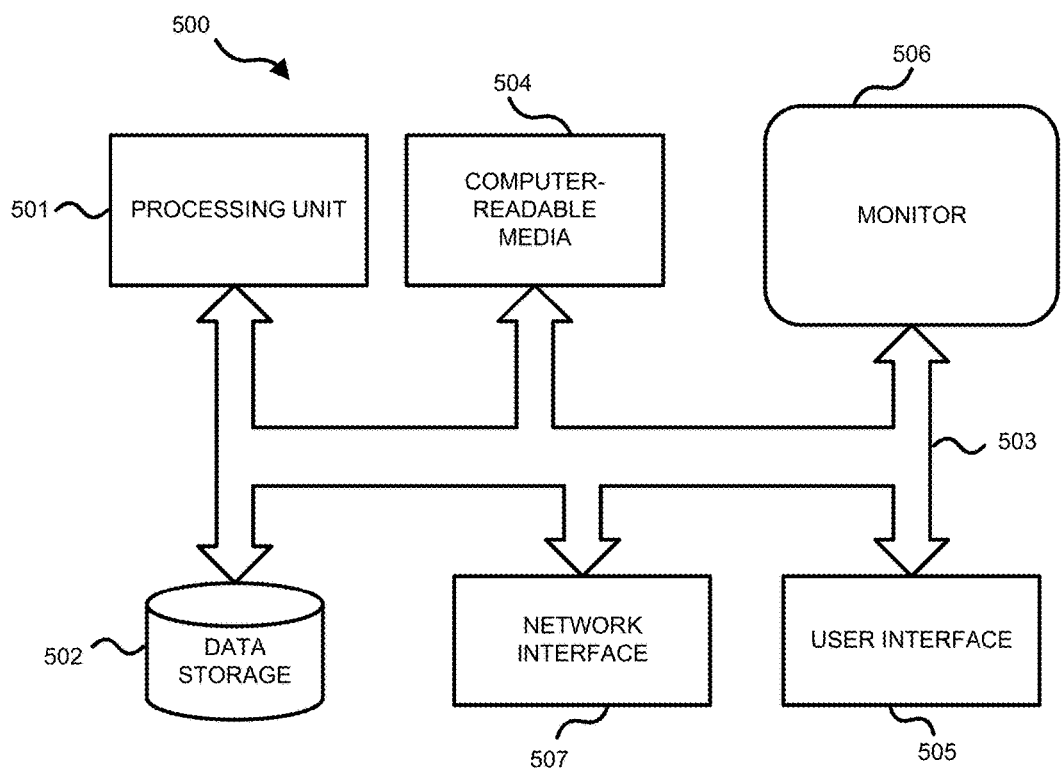
FIG. 5 illustrates an example of a suitable computing and networking environment on which the embodiments of the smart password system may be implemented.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media, including, for example, memory storage devices.

With reference to FIG. 5, an exemplary system for implementing various aspects of the invention may include a general purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 500 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

In an example embodiment, a method may be implemented on a computer, the method comprising: identifying an incorrect credential received in an authentication request; identifying a user trait associated with the user sending the authentication request with the incorrect credential; incrementing a first counter if the user trait is familiar; and incrementing a second counter if the user trait is unfamiliar.

The computer-implemented method may further comprise, if the user trait is familiar, comparing a first counter value to a first threshold; and locking out additional access attempts associated with the familiar trait if the first counter value has exceeded the first threshold, wherein additional access attempts associated with the unfamiliar trait are allowed unless the second counter value has exceeded the second threshold.

The computer-implemented method may further comprise, if the user trait is unfamiliar, comparing a second counter value to a second threshold; and locking out additional access attempts associated with the unfamiliar trait if the second counter value has exceeded the second threshold, wherein additional access attempts associated with the familiar trait are allowed unless the first counter value has exceeded the first threshold.

The computer-implemented method may further comprise, resetting the first counter value after a cooldown time has expired.

The computer-implemented method may further comprise, resetting the second counter value after a cooldown time has expired.

The user trait may be a location associated with the origin of the authentication request, and wherein the location is familiar if a user initiated a prior successful authentication request from the location.

The computer-implemented method may further comprise, storing complete or partial hashes of prior incorrect credentials in a storage.

The computer-implemented method may further comprise, comparing the incorrect credential received in the authentication request to the storage; and preventing the first or second counter from being incremented when the incorrect credential matches a prior incorrect credential.

The credential may be selected from the group consisting of: an application password, an authenticator-generated code, a code sent via email, text, message or mobile device, a secret answer, a one-time use code, a one-time token (OTT), and a personal identification number (PIN).

An example system comprises: an interface configured to receive an authentication request with an incorrect credential; a first counter configured to be incremented if a trait associated with a user sending the authentication request is familiar; and a second counter configured to be incremented if the trait associated with the user is unfamiliar. The interface may be, for example, a user interface, a network interface, a line card, an input/output card, an Ethernet card, or the like.

The system may further comprise: a processor configured to, if the trait is familiar, compare a first counter value to a first threshold; and configured to lock out additional access attempts associated with the familiar trait if the first counter value has exceeded the first threshold, wherein additional access attempts associated with the unfamiliar trait are allowed unless the second counter value has exceeded the second threshold.

The system may further comprise: a processor configured to, if the user trait is unfamiliar, compare a second counter value to a second threshold; and configured to lock out additional access attempts associated with the unfamiliar trait if the second counter value has exceeded the second threshold, wherein additional access attempts associated with the familiar trait are allowed unless the first counter value has exceeded the first threshold.

The first counter value in the system may be reset after a cooldown time has expired.

The second counter value in the system may be reset after a cooldown time has expired.

The user trait may be a location associated with the origin of the authentication request, and wherein the location is familiar if a user initiated a prior successful authentication request from the location.

The system may further comprise: a storage device configured to store complete or partial hashes of prior incorrect credentials.

The system may further comprise: a processor configured to, compare the incorrect credential received in the authentication request to the storage; and configured to prevent the first or second counter from being incremented when the incorrect credential matches a prior incorrect credential.

The credential is selected from the group consisting of: an application password, an authenticator-generated code, a code sent via email, text, message or mobile device, a secret answer, a one-time use code, a one-time token (OTT), and a personal identification number (PIN).

In other embodiments, a computer-readable storage device may store computer-executable instructions that when executed by at least one processor cause the at least one processor to perform the method recited above. The computer-readable storage device may comprise, for example, a memory device, a storage device, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for controlling access to a computing account by preventing potentially malicious authentication requests originating from unrecognized sources from interfering with a determined normal usage of the computing account, the access being controlled through use of multiple distinct counters that are used to monitor different types of access attempts, the method being performed by one or more processors of a computer system and comprising:
   at the computer system, receiving an authentication request requesting access to the computing account, the authentication request being received from a user device that is requesting the access to the computing account;
   at the computer system, determining that the authentication request includes an incorrect credential, the incorrect credential being a credential that is presently unusable to gain access to the computing account;
   at the computer system, identifying a device trait associated with the user device that transmitted the authentication request, the device trait being used by the computer system to determine whether the user device is familiar or unfamiliar, wherein the computer system determines that the user device is familiar when the computer system identifies a particular relationship existing between the user device's device trait and the computing account, and wherein the computer system determines that the user device is unfamiliar when the computer system is unable to identify the particular relationship;
   at the computer system, incrementing a first counter when the computer system determines that the user device is familiar and when the incorrect credential is received, the first counter being associated with the determined normal usage of the computing account and being used to identify when familiar user devices are submitting incorrect credentials;
   at the computer system, incrementing a second counter when the computer system determines that the user device is unfamiliar and when the incorrect credential is received, wherein the second counter is not associated with the determined normal usage of the computing account and instead is used to identify when potentially malicious authentication requests are being submitted; and
   at the computer system, selectively modifying access to the computing account based on the second counter.

2. The computer-implemented method of claim 1, further comprising:
   if the user device is familiar, comparing a first counter value of the first counter to a first threshold; and
   locking out additional access attempts associated with the familiar user device if the first counter value has exceeded the first threshold, wherein additional access attempts associated with an unfamiliar user device are allowed unless a second counter value of the second counter has exceeded a second threshold.

3. The computer-implemented method of claim 1, further comprising:
   if the user device is unfamiliar, comparing a second counter value of the second counter to a second threshold; and
   locking out additional access attempts associated with the unfamiliar user device if the second counter value has exceeded the second threshold, wherein additional access attempts associated with a familiar user device are allowed unless a first counter value of the first counter has exceeded a first threshold.

4. The computer-implemented method of claim 2, further comprising:
   resetting the first counter value after a cooldown time has expired.

5. The computer-implemented method of claim 3, further comprising:
   resetting the second counter value after a cooldown time has expired.

6. The computer-implemented method of claim 1, wherein the device trait is a current location associated with the user device, and wherein the user device is determined to be familiar if a prior successful authentication request originated from the current location of the user device such that the particular relationship is determined to include a condition in which the prior successful authentication request originated from the current location.

7. The computer-implemented method of claim 1, further comprising:
   at the computer system, storing a list of complete or partial hashes of a selected number of prior incorrect credentials in a storage while refraining from storing the actual prior incorrect credentials in the storage; and
   checking a determined hash of the incorrect credential against the complete or partial hashes in the list to determine whether the determined hash is included in the list.

8. The computer-implemented method of claim 1, further comprising:
   comparing the incorrect credential received in the authentication request to a list of prior incorrect credentials stored in a storage; and
   preventing the first or second counter from being incremented when the incorrect credential matches at least one of the prior incorrect credentials stored in the storage.

9. The computer-implemented method of claim 1, wherein the incorrect credential is selected from the group consisting of: an application password, an authenticator-generated code, a code sent via email, text, message or mobile device, a secret answer, a one-time use code, a one-time token (OTT), and a personal identification number (PIN).

10. A system comprising:
one or more processors; and
one or more computer-readable hardware storage devices having stored thereon computer-executable instructions that are executable by the one or more processors to cause the system to control access to a computing account by preventing potentially malicious authentication requests originating from unrecognized sources from interfering with a determined normal usage of the computing account, the computing account being controlled through use of multiple distinct counters that are used to monitor different types of access attempts, the computer-executable instructions thereby causing the computer system to:
at the computer system, receive an authentication request requesting access to the computing account, the authentication request being received from a user device that is requesting the access to the computing account;
at the computer system, determine that the authentication request includes an incorrect credential, the incorrect credential being a credential that is presently unusable to gain access to the computing account;
at the computer system, identify a device trait associated with the user device that transmitted the authentication request, the device trait being used by the computer system to determine whether the user device is familiar or unfamiliar, wherein the computer system determines that the user device is familiar when the computer system identifies a particular relationship existing between the user device's device trait and the computing account, and wherein the computer system determines that the user device is unfamiliar when the computer system is unable to identify the particular relationship;
at the computer system, increment a first counter when the computer system determines that the user device is familiar and when the incorrect credential is received, the first counter being associated with the determined normal usage of the computing account and being used to identify when familiar user devices are submitting incorrect credentials;
at the computer system, increment a second counter when the computer system determines that the user device is unfamiliar and when the incorrect credential is received, wherein the second counter is not associated with the determined normal usage of the computing account and instead is used to identify when potentially malicious authentication requests are being submitted; and
at the computer system, selectively modify access to the computing account based on the second counter.

11. The system of claim 10, wherein execution of the computer-executable instructions further causes the system to:
if the user device is familiar, compare a first counter value of the first counter to a first threshold; and
lock out additional access attempts associated with the familiar user device if the first counter value has exceeded the first threshold, wherein additional access attempts associated with an unfamiliar user device are allowed unless a second counter value of the second counter has exceeded a second threshold.

12. The system of claim 10, wherein execution of the computer-executable instructions further causes the system to:
if the user device is unfamiliar, compare a second counter value of the second counter to a second threshold; and
lock out additional access attempts associated with the unfamiliar user device if the second counter value has exceeded the second threshold, wherein additional access attempts associated with a familiar user device are allowed unless a first counter value of the first counter has exceeded a first threshold.

13. The system of claim 11, wherein the first counter value is reset after a cooldown time has expired.

14. The system of claim 12, wherein the second counter value is reset after a cooldown time has expired.

15. The system of claim 10, wherein the device trait is a current location associated with the user device, and wherein the user device is determined to be familiar if a prior successful authentication request originated from the current location of the user device.

16. The system of claim 10, further comprising:
a storage device configured to store complete or partial hashes of prior incorrect credentials.

17. The system of claim 16, wherein execution of the computer-executable instructions further causes the system to:
compare the incorrect credential received in the authentication request to a list of prior incorrect credentials stored in a storage; and
prevent the first or second counter from being incremented when the incorrect credential matches at least one of the prior incorrect credentials stored in the storage.

18. The system of claim 10, wherein the incorrect credential is selected from the group consisting of: an application password, an authenticator-generated code, a code sent via email, text, message or mobile device, a secret answer, a one-time use code, a one-time token (OTT), and a personal identification number (PIN).

19. One or more hardware storage devices having stored thereon computer-executable instructions that are executable by one or more processors of a computer system to cause the computer system to control access to a computing account by preventing potentially malicious authentication requests originating from unrecognized sources from interfering with a determined normal usage of the computing account, the computing account being controlled through use of multiple distinct counters that are used to monitor different types of access attempts, the computer-executable instructions thereby causing the computer system to:
at the computer system, receive an authentication request requesting access to the computing account, the authentication request being received from a user device that is requesting the access to the computing account;
at the computer system, determine that the authentication request includes an incorrect credential, the incorrect credential being a credential that is presently unusable to gain access to the computing account;
at the computer system, identify a device trait associated with the user device that transmitted the authentication request, the device trait being used by the computer system to determine whether the user device is familiar or unfamiliar, wherein the computer system determines that the user device is familiar when the computer system identifies a particular relationship existing between the user device's device trait and the computing account, and wherein the computer system determines that the user device is unfamiliar when the computer system is unable to identify the particular relationship;

at the computer system, increment a first counter when the computer system determines that the user device is familiar and when the incorrect credential is received, the first counter being associated with the determined normal usage of the computing account and being used to identify when familiar user devices are submitting incorrect credentials;

at the computer system, increment a second counter when the computer system determines that the user device is unfamiliar and when the incorrect credential is received, wherein the second counter is not associated with the determined normal usage of the computing account and instead is used to identify when potentially malicious authentication requests are being submitted; and at the computer system, selectively modify access to the computing account based on the second counter.

20. The one or more hardware storage devices of claim 19, wherein execution of the computer-executable instructions further causes the computer system to:
  if the user device is familiar:
    compare a first counter value of the first counter to a first threshold; and
    lock out additional access attempts associated with the familiar user device if the first counter value has exceeded the first threshold, wherein additional access attempts associated with an unfamiliar user device are allowed unless a second counter value of the second counter has exceeded a second threshold; and if the user device is unfamiliar:
  compare the second counter value to the second threshold; and
  lock out additional access attempts associated with the unfamiliar user device if the second counter value has exceeded the second threshold, wherein additional access attempts associated with the familiar user device are allowed unless the first counter value has exceeded the first threshold.

* * * * *